Patented Dec. 15, 1936

2,064,487

UNITED STATES PATENT OFFICE 2,064,487

TREATMENT OF RESINS

Stuart P. Miller, Englewood, N. J., assignor to The Barrett Company, New York, N. Y., a corporation of New Jersey No Drawing. Application October 2, 1930, Serial No. 486,055

5 Claims. (Cl. 83—91)

This invention relates to the treatment of resins and particularly to the treatment of resins of the coumarone-indene type to prepare the resins for use.

The principal objects of the present invention are to provide a new process for preparing resin for the market, to reduce the cost and increase the speed of preparing the resin, and to produce resin in a new form in which it is suitable for use or shipment.

These and other objects and features of the invention will appear from the following description thereof.

In accordance with my invention, the resin is formed into separate particles of small size which are ordinarily in the form of hollow tubes or hollow globules of irregular form. Although the particles are not perfectly formed, that is they may not be in the form of continuous tubes or hollow spheres of resin, they approximate these shapes so as to be of characteristic form. However, under certain conditions of operation the resin may be treated so as to form solid strings, small rounded particles or granules.

In order to reduce the resin to this new form it is melted and cooled rapidly by introducing the resin into a cooling liquid, such as water or any other suitable liquid, in which the resin is substantially insoluble. In treating resins and particularly resins of the coumarone indene type, I heat the resin above its melting point, or until fluid and introduce the resin preferably by pouring or spraying the same into water at a temperature below that of the resin being introduced. The cooled resin is separated from the water and dried, after which it may be packed or stored, or it may be further ground or crushed if desired.

By varying the temperature of the cooling liquid or of the resin or both, I can control the form of the resulting product obtained at will. The formation of hollow particles (tubes or droplets) is favored by higher temperatures of resin and water or other cooling liquor, as by introducing resin heated to a temperature considerably above 100° C. into warm water. The steam or vapor produced by contact with the hot molten resin probably acts to form the hollows within the particles produced. If the cooling medium into which the resin is introduced is at a relatively low temperature the resin is cooled rapidly and the resulting product is all or largely in a solid form. A subdivision of the inflowing molten resin into fine streams as well as agitation of the cooling medium with air or otherwise, favors the formation of droplets or small particles of resin as distinguished from tubes or strings of resin.

My invention may be carried out by means of any suitable apparatus and the particular manner of practicing the invention may be varied considerably. In order that my invention will be more clearly understood, it will be illustrated by the following examples:

Coumarone resin of about 130° C. melting point, heated to a temperature of about 170° C. is sprayed through a nozzle into water at a temperature of about 70° C. from a height of 14 inches above the water. The water is gently agitated by blowing air therethrough. The cooled resin product is collected and allowed to drain for about 6 hours, after which air is blown over the product for about 4 hours. The particles of resin produced are somewhat granular in form and of various shapes. They are not entirely solid, most of the particles having a hollow space therein. The hollow or partly hollow form of the resin is a friable product that is particularly well adapted to fine grinding.

The size of the stream or streams of the resin introduced into the cooling liquid may be varied. I may introduce the resin in a single stream but I prefer ordinarily to introduce the resin in a spray or a plurality of streams of from $\frac{1}{8}$ to $\frac{1}{16}$ inch in diameter. The cooling liquid employed is preferably water but I may use other liquids which are of greater or less specific gravity than the resin so that the resin may be collected from the bottom of the tank or vessel into which the resin is introduced, or it may collect upon the upper surface of the liquid. The resin may be introduced into the liquid either above or below the surface of the cooling liquid as desired. The temperature of the cooling liquid is preferably from 60° to 80° C. although the temperature may be considerably lower or somewhat higher than the preferred temperatures, depending upon the nature of the resin treated and the character of the final product desired.

I prefer to carry out the process continuously, introducing the resin continuously, and at the same time removing the cooled product from the cooling liquid continuously. For example, the coumarone resin may be introduced into water in a cooling vessel in such a manner that the water or cooling liquid passes in one direction through the vessel and the cooled resin passes in a direction countercurrent to the flow of water through the vessel and is continuously removed therefrom. However, if preferred, the process may be carried out intermittently or in batch operation, by means of any suitable apparatus.

The cooled resin which is largely in the form of hollow particles or bodies may be readily ground to reduce it in size, although the product is suitable for most purposes without resorting to any subsequent grinding operation.

Although the invention is particularly applicable to treatment of resins of the coumarone-indene type, the invention is applicable to the treatment of other resins or resinous materials to prepare the material for use.

I claim:

1. The method of treating resin of the coumarone indene type to produce hollow discrete particles, which comprises melting the resin and passing it while molten in a stream into a cooling liquid maintained at a temperature of from about 60° C. to about 80° C.

2. The method of treating resin of the coumarone indene type to produce hollow discrete particles, which comprises heating the resin to about 170° C. and passing it while molten in a stream into water at a temperature between 60° and 80° C.

3. The method of treating resin of the coumarone-indene type which comprises heating the resin to about 170° C., or until molten and at a temperature above the melting point thereof, spraying the molten resin continuously in a plurality of streams about ⅛ inch in diameter into water maintained at about 60 to 80° C., agitating the water, continuously removing the cooled product, and drying the same.

4. The method of treating resin of the coumarone-indene type which comprises melting the resin, heating the same to a temperature above the melting point thereof, continuously introducing the molten resin in a stream into water at a temperature below 100° C. and above about 60° C., and separating the resulting product from the water.

5. As a new product of manufacture, a mass of resin of the coumarone-indene type, the individual particles of which are in the form of small separately formed hollow particles.

STUART P. MILLER.